Nov. 1, 1955          H. W. HAPMAN          2,722,315
ROTATABLE FILTERING APPARATUS
Original Filed Oct. 12, 1944
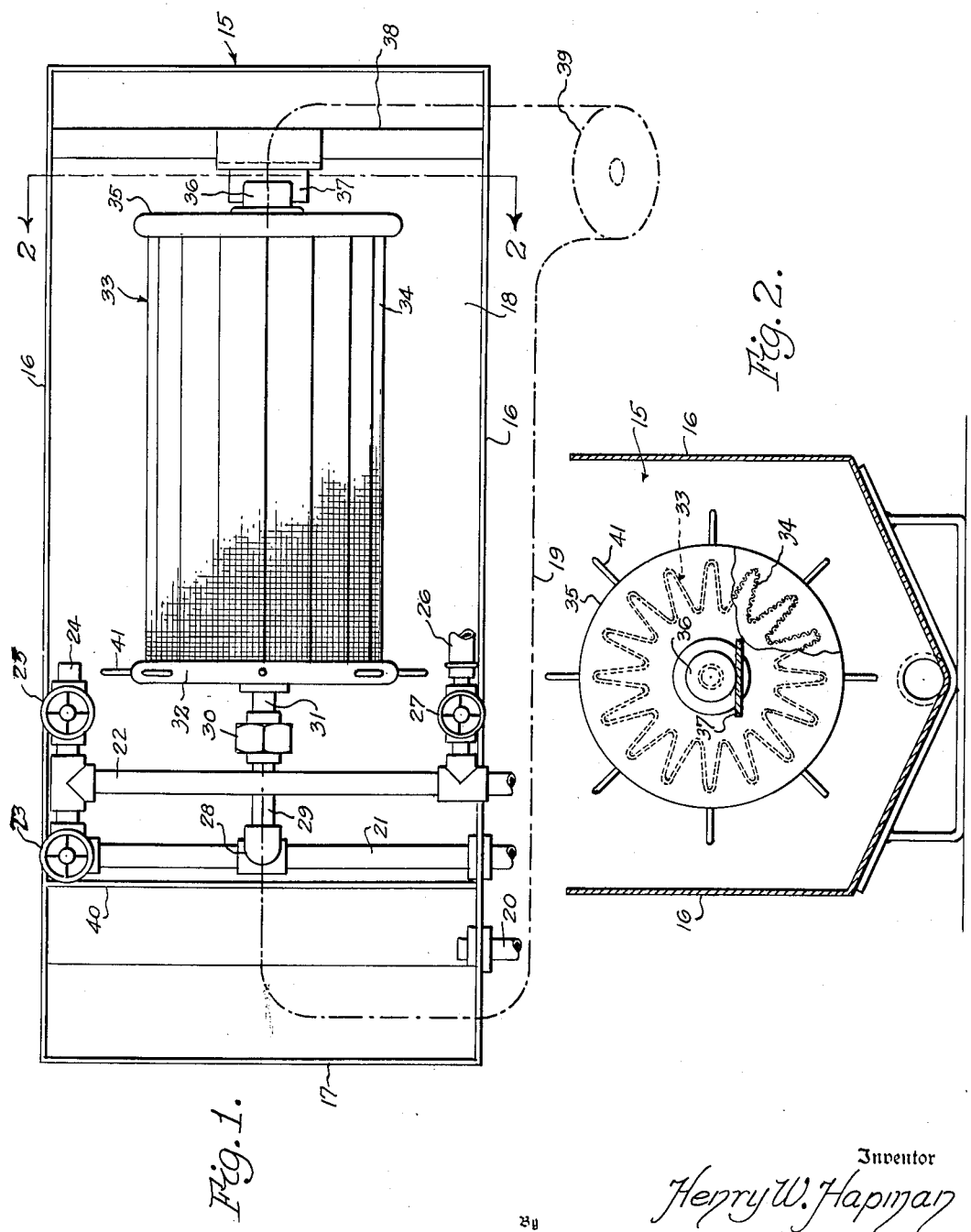
Inventor
Henry W. Hapman
Barthel + Bugbee
Attorneys

United States Patent Office 2,722,315
Patented Nov. 1, 1955

2,722,315

ROTATABLE FILTERING APPARATUS

Henry W. Hapman, Kalamazoo, Mich., assignor of forty per cent to Hannah Jane Hapman, Kalamazoo, Mich.

Original application October 12, 1944, Serial No. 558,424, now Patent No. 2,559,614, dated July 10, 1951. Divided and this application November 15, 1950, Serial No. 195,849

1 Claim. (Cl. 210—154)

The present invention relates to improvements in coolant tanks, and in particular, to a sludge removing and filtering apparatus therefor.

One object of the invention is to provide a coolant and sludge tank in which the coolant liquid is circulated therethrough in such a manner as to be freed from foreign particles and to provide means for removing said particles and filtering the coolant liquid to purify the same for recirculation to the source of use.

Another object is to provide a coolant tank and sludge remover which is provided with a filter element capable of being readily removed for the purpose of cleaning, repair and reconditioning so as to restore the filter element to its initial cleanliness at various intervals during the use of the coolant tank.

Another object is to provide a coolant tank and sludge tank having a sludge conveyor and filtering element arranged to swing on a horizontal axis to permit frequent cleaning and inspection from time to time without removing the filtering element independently and to provide means for removing foreign matter and particles from the filtering element.

Another object is to provide a coolant tank and sludge remover which is provided with a filter element capable of being rotated on a substantially horizontal axis for the purpose of cleaning, repair and reconditioning so as to restore the filter element to its initial cleanliness at various intervals during the use of the coolant tank.

In the drawings:

Figure 1 is a top plan view of a sludge tank equipped with a swingable and rotatable filter, according to one form of the invention; and Figure 2 is a vertical section taken along the line 2—2 in Figure 1.

Referring to the drawings in detail, Figures 1 and 2 show one form of the invention in which a coolant tank, generally designated 15, is composed of side walls 16 having end walls 17 and a bottom wall 18 having converging or sloping sections to form a trough for an endless flight conveyor 19. A fluid circulating pump (not shown) is provided for the coolant tank shown in Figure 1, and said pump has its intake connected to pipes 20 and 21. The discharge side of the pump is connected to a pipe line 22 and said pipe line is connected to the pipe through the medium of a control valve 23, and to a discharge nipple 24 by means of a control valve 25. In addition, a rubber cleaning hose 26 is coupled to the discharge pipe 22 so that upon closing of the valves 23 and 25 and opening of the valve 27, fluid under pressure may be forced through the flexible hose 26 for the purpose of washing the external surface of the filtering element mounted in the tank.

Interposed in the pipe 21 is a union or coupling 28 to which is secured a short length of pipe 29 having a swivel coupling on the end thereof as at 30. The swivel coupling is provided with a short length of pipe or rearward pivot member 31 which is connected to the header 32 of a rotary filtering element 33 which is formed with a zigzag peripheral surface in much the same manner as the filtering elements shown in Figures 6 to 10 inclusive of my co-pending U. S. Patent No. 2,559,614, issued July 10, 1951, of which this application is a division. That is to say, the reticulated screening 34 has its ends embedded in the header 32 and a similar header 35 with a central supporting pipe extending therebetween to hold the reticulated screening or fabric 34 in its pre-shaped position.

The free end of the filter is supported by means of a projection or forward pivot member 36 formed on the end header 35 which is adapted to rest upon a supporting shelf or filter pivot rest 37 carried by the supporting bar 38 connecting the side walls 16 of the coolant tank 15. The conveyor or sludge collector 19 is driven by an electric motor (not shown) which is drivingly connected to a sprocket wheel 39, and said coolant tank is provided with a baffle wall 40 adjacent one end to form and provide an inlet chamber into which the coolant liquid is discharged from the machine tool. In order to manually rotate the filtering element 33 periodically, a series of handles 41 is provided on the header 32.

During operation of the coolant tank shown in Figures 1 and 2, the liquid is pumped from the tank through the filtering element and thence through the short pipe 29 to the intake of the pump through the pipe 21 when it is discharged through the pipe 22 to the machine tool by way of the discharge nipple 24. The entire filtering element may be rotated on the swivel 30 by simply rotating the pipe 31 a slight angular distance by means of the handles 41 to present new filtering surfaces to the coolant liquid being filtered and recirculated. In addition, the filtering element 33 may be completely removed from the tank 15 by uncoupling the swivel coupling 30 and then freely lifting the filtering element 33 bodily upward out of the liquid.

This application is a division of my co-pending application Serial No. 558,424, filed October 12, 1944, for Apparatus for Conditioning, Cleaning and Circulating Cooling Liquid, which has since been issued as U. S. Patent No. 2,559,614 dated July 10, 1951.

What I claim is:

A liquid filtering apparatus comprising a tank for collecting sediment-bearing liquid, a pipe extending into said tank and having a substantially horizontal end portion therein, a swivel coupling mounted on said end portion and having relatively-rotatable separable swivel components, said components having a liquid passageway extending therethrough, a filter pivot support disposed in said tank in axial alignment with said coupling and spaced apart therefrom, said filter pivot support having an upwardly-facing bearing portion on the upper side thereof, and a perforated rotatable filter detachably connected to said pipe at said coupling and removably mounted in said tank in the space between said coupling and said pivot support, said filter having spaced opposite ends with axially-aligned pivot members thereon, one of said pivot members being tubular and connected to one component of said coupling, said filter element being coupled at only one end thereof, and the other pivot element at the other end of said filter element opposite the coupled end thereof resting upon and rotatably and detachably engaging said bearing portion of said filter pivot support whereby said filter may be selectively rotated a partial revolution periodically to move clogged portions thereof out of the liquid while moving unclogged portions thereof into the liquid, or quickly and easily removed bodily from the tank.

(References on following page)

References Cited in the file of this patent

UNITED STATES PATENTS

| Number | Name | Date |
|---|---|---|
| 376,095 | Hyatt | Jan. 10, 1888 |
| 785,531 | Weller | Mar. 21, 1905 |
| 1,041,331 | Nelson | Oct. 15, 1912 |
| 1,225,696 | Bicalky | May 8, 1917 |
| 1,293,297 | Anderson | Feb. 4, 1919 |
| 1,338,999 | Peck | May 4, 1920 |
| 1,499,851 | Brown, Jr. | July 1, 1924 |
| 1,716,040 | Genter | June 4, 1929 |
| 1,945,492 | Lamort | Jan. 30, 1934 |
| 2,396,336 | Moore | Mar. 12, 1946 |
| 2,427,967 | Hoster | Sept. 23, 1947 |
| 2,430,713 | Eves et al. | Nov. 11, 1947 |

FOREIGN PATENTS

| Number | Country | Date |
|---|---|---|
| 835,826 | France | Oct. 3, 1938 |